Jan. 10, 1956  B. R. DAVIS  2,730,162
ADJUSTABLE AUTOMOBILE SEAT
Filed June 8, 1953
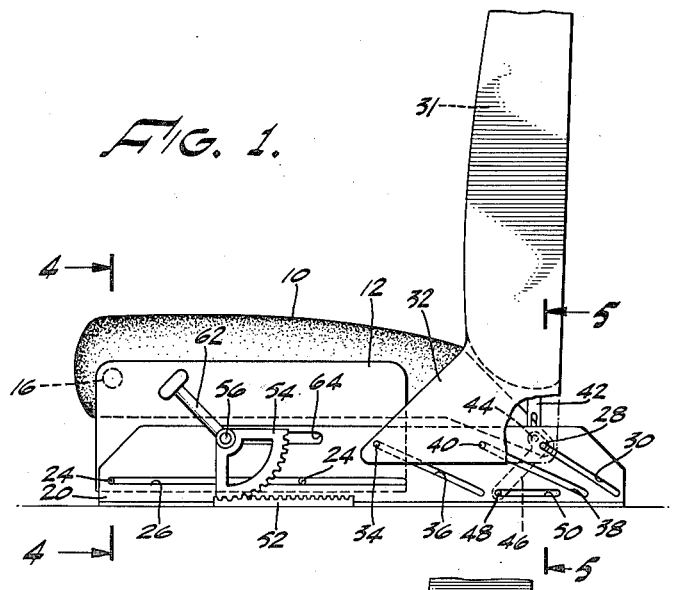
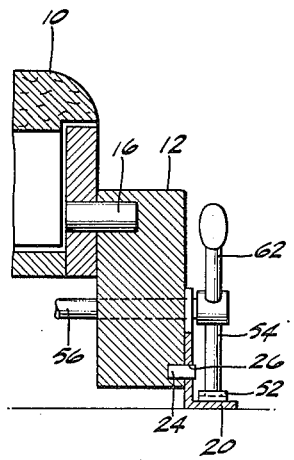
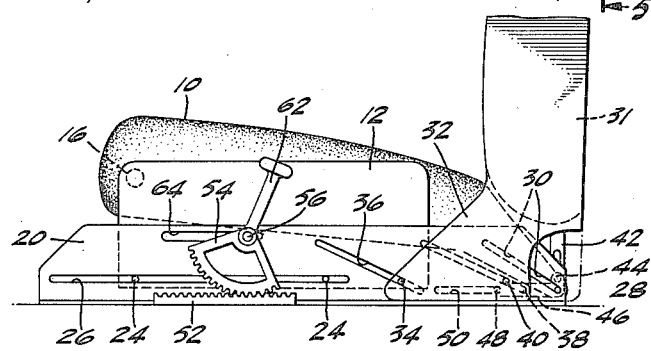
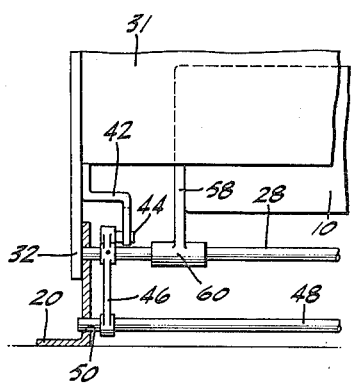
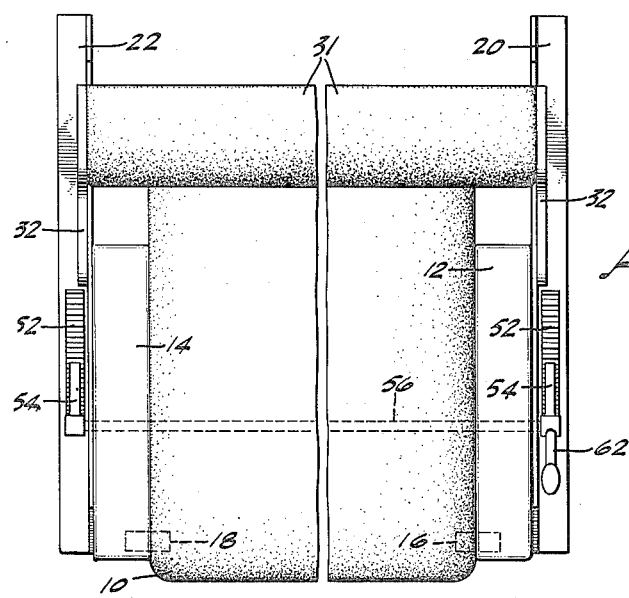
BRUCE R. DAVIS
INVENTOR.
BY
Lyon & Lyon
ATTORNEYS United States Patent Office 2,730,162
Patented Jan. 10, 1956

2,730,162
ADJUSTABLE AUTOMOBILE SEAT
Bruce R. Davis, Santa Barbara, Calif.

Application June 8, 1953, Serial No. 360,045

4 Claims. (Cl. 155—14)

This invention relates to an improved construction for a seat or chair and particularly to a seat or chair for use in a conveyance such as an automobile.

An object of this invention is to provide a seat which will accommodate either a tall or short occupant seated with his weight supported over a large area of the under-thigh reducing stress and tension and resulting fatigue.

It is a further object of this invention to provide a seat wherein the eye level of the occupant is maintained at the proper position irrespective of the height of the occupant.

Other objects and advantages will be readily apparent from the following description.

In the drawings:

Figure 1 is a side elevation of an automobile seat embodying this invention in the forward position.

Figure 2 is a similar side elevation with the seat in the rearmost position.

Figure 3 is a plan view of the seat.

Figure 4 is a partial sectional view taken along line 4—4 of Figure 1.

Figure 5 is a partial sectional view taken along line 5—5 of Figure 1.

Figures 1 through 5 illustrate a seat constructed for use as the front seat of an automobile. The seat 10 is positioned between side frames 12 and 14 and is pivotally connected at its forward extremity to the side frames by pins 16 and 18. The side frames in turn are slidably supported by slides 20 and 22, which are suitably secured to the floor by means of pins such as 24 which project through a slot 26 in the slides 20 and 22. In this manner the seat 10 can be moved forwardly or rearwardly with respect to the slides.

The rear extremity of seat 10 carries a rod 28 which projects through slots 30 formed in the rear of the slides 20 and 22. Th slots 30 are inclined upwardly and towards the front of the seat permitting the seat to be moved in a horizontal plane forward or rearward and during such movement the rear extremity of the seat is raised or lowered. As seen in Figure 1 the seat is in its foremost position with the rear of the seat in its uppermost position thereby accommodating a short driver. In Figure 2 the seat is at its rearmost position and the rear extremity of the seat is at its lowest position to accommodate a tall driver. Of course, the seat can be moved to any intermediate position to accommodate the occupant.

A back rest 31 has a pair of side plates 32 which project below the bottom of the cushion and which are mounted upon the slides 20 and 22 in the same manner. A rod 34 connects the forward portion of the side plates and projects through a slot 36 in slides 20 and 22. A second slot 38 is provided in each slide through which a pin 40 projects, which pin is mounted on side plates 32. Each side plate has fixed thereto a slotted bracket 42 which receives pin 44 of lever 46. The lever 46 is, in this embodiment, triangular in shape having pin 44 in one corner being fixed to seat elevating rod 28 in a second corner and the third corner having a rod 48 which projects through a horizontal slot 50 in slides 20 and 22. Thus the movement of the back rest is tied to the movement of the seat 10 by the common connection to rod 28. Seat 10 is secured to rod 28 by means of bracket 58 and sleeve 60 journaled on rod 28. When the seat is moved forward the back rest is similarly moved forward. The back rest is also raised by the inclination of slots 30, 36 and 38 as it moves forward.

The angle of inclination of the slots 36 and 38 control the vertical position of the back rest. As illustrated in Figures 1 and 2 the slots will maintain the back rest substantially vertical although it can be caused to tilt from the vertical by varying the inclination of the slots. By this means and by means of the common connection to rod 28 of both the seat and the back rest they can be moved from the forward to rear position without any gap forming between the two.

Any convenient means may be utilized to move the seat and back rest. In this embodiment racks 52 are mounted adjacent each slide and meshes with gear segments 54, which gear segments are mounted upon a shaft 56 which is secured to the side frames 12 and 14 of seat 10. One of the gear segments is provided with a handle 62 and slides 20 and 22 are provided with horizontal slots 64 to permit movement of the shaft with the seat.

While what hereinbefore has been described as the preferred embodiment of this invention, it is readily apparent that alterations and modifications can be resorted to without departing from the scope of this invention and such alterations and modifications are intended to be included within the scope of the appended claims.

I claim:

1. A conveyance seat comprising: a seat, slide means upon which said seat is pivotally mounted for horizontal movement, a back rest mounted upon said slide means for horizontal movement with said seat, means for raising and lowering said back rest during horizontal movement of said seat and back rest, and means pivoting said seat in conjunction with vertical movement of said back rest so that the lower extremity of said back rest and the rear extremity of said seat are substantially in contact at all positions of said seat.

2. A conveyance seat comprising: a seat, slide means upon which said seat is pivotally mounted for horizontal movement, a back rest mounted upon said slide means for horizontal movement with said seat, means for translating horizontal movement of said seat into pivotal movement to raise and lower the rear extremity thereof, and means for translating horizontal movement of said back rest into vertical movement of said back rest so that the lower extremity of said back rest and the rear extremity of said seat are substantially in contact at all positions thereof.

3. A conveyance seat comprising: slide means, a seat, means carried by said seat engaging said slide means to support said seat on said slide means and permit horizontal movement of said seat along said slide means, means carried by said seat engaging said slide means pivoting said seat about an axis adjacent the front thereof as said seat is moved horizontally, a back rest, means carried by said back rest engaging said slide means moving said back rest horizontally with said seat, and means carried by said back rest for vertically moving said back rest when said back rest is moved horizontally.

4. A conveyance seat comprising: slide means having a horizontal slot therein, a seat, projections on said seat adjacent the front extremity thereof entering said horizontal slot mounting said seat on said slide for horizontal movement thereon, said slide means having an inclined slot adjacent the rear extremity of said seat, said seat having projections thereon adjacent the rear extremity thereof entering said inclined slot and raising and lowering the rear extremity of said seat as said seat is moved horizontally, a back rest linked to the rear extremity of said seat, said slide means having at least one additional inclined slot, projections on said back rest entering said additional inclined slot so that upon horizontal movement of said seat and back rest the back rest is raised and lowered at substantially the same rate as the rear of the seat is pivoted preventing the formation of a gap between the two.

References Cited in the file of this patent

UNITED STATES PATENTS

| | | |
|---|---|---|
| 809,944 | Hanger | Jan. 16, 1906 |
| 1,685,770 | Bowen | Oct. 2, 1928 |
| 2,170,923 | Jacobs | Aug. 29, 1939 |
| 2,175,452 | Whedon | Oct. 10, 1939 |
| 2,188,997 | Davis | Feb. 6, 1940 |
| 2,298,351 | De Rose | Oct. 13, 1942 |

FOREIGN PATENTS

| | | |
|---|---|---|
| 631,929 | Great Britain | Nov. 11, 1949 |